United States Patent
Brandt-Pearce et al.

(10) Patent No.: US 11,408,959 B2
(45) Date of Patent: Aug. 9, 2022

(54) POSITIONING THROUGH MULTIPATH REFLECTION

(71) Applicants: University of Virginia Patent Foundation, Charlottesville, VA (US); Maite Brandt-Pearce, Free Union, VA (US); Hamid Hosseinianfar, Charlottesville, VA (US); Mohammad Noshad, Charlottesville, VA (US)

(72) Inventors: Maite Brandt-Pearce, Free Union, VA (US); Hamid Hosseinianfar, Charlottesville, VA (US); Mohammad Noshad, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 16/956,712

(22) PCT Filed: Dec. 21, 2018

(86) PCT No.: PCT/US2018/067281
§ 371 (c)(1),
(2) Date: Jun. 22, 2020

(87) PCT Pub. No.: WO2019/126743
PCT Pub. Date: Jun. 27, 2019

(65) Prior Publication Data
US 2020/0333422 A1 Oct. 22, 2020

Related U.S. Application Data

(60) Provisional application No. 62/609,371, filed on Dec. 22, 2017.

(51) Int. Cl.
*H04B 10/114* (2013.01)
*G01S 1/70* (2006.01)
(Continued)

(52) U.S. Cl.
CPC ........ *G01S 1/70* (2013.01); *G01S 5/16* (2013.01); *H04B 10/11* (2013.01); *H04B 10/114* (2013.01);
(Continued)

(58) Field of Classification Search
None
See application file for complete search history.

(56) References Cited

U.S. PATENT DOCUMENTS 9,712,979 B2   7/2017   Keerthi
10,256,906 B2  4/2019   Brandt-Pearce et al.
(Continued)

FOREIGN PATENT DOCUMENTS

WO   WO-2019126743 A1   6/2019

OTHER PUBLICATIONS

Gu et al: "Impact of Multipath Reflections on the Performance of Indoor Visible Light Positioning Systems", JLT, vol. 34, No. 10, May 15, 2016, pp. 2578-2587 (Year: 2016).*
(Continued)

*Primary Examiner* — Li Liu
(74) *Attorney, Agent, or Firm* — Schwegman Lundberg & Woessner, P.A.

(57) ABSTRACT

A positioning system and method includes a transmitter, a receiver, and a controller. The transmitter includes at least one energy source configured to emit an optical or quasi-optical electromagnetic signal as a channel communication. The receiver includes at least one detector element configured to receive the channel communication. The controller is connected to the receiver and configured to estimate a position of the transmitter within a space using a reference map of the space and one or more diffuse components of an impulse response of the channel communication.

17 Claims, 6 Drawing Sheets

(51) Int. Cl.
| | |
|---|---|
| *G01S 5/16* | (2006.01) |
| *H04B 10/11* | (2013.01) |
| *H04B 10/50* | (2013.01) |
| *H04B 10/69* | (2013.01) |
| *H04L 25/02* | (2006.01) |

(52) U.S. Cl.
CPC ........... *H04B 10/502* (2013.01); *H04B 10/69* (2013.01); *H04L 25/0212* (2013.01)

(56) References Cited

U.S. PATENT DOCUMENTS

| | | | |
|---|---|---|---|
| 2007/0019769 | A1 | 1/2007 | Green et al. |
| 2007/0177680 | A1 | 8/2007 | Green et al. |
| 2009/0186658 | A1 | 7/2009 | Jiang et al. |
| 2013/0028612 | A1 | 1/2013 | Ryan et al. |
| 2013/0273935 | A1 | 10/2013 | Amizur et al. |
| 2014/0186026 | A1 | 7/2014 | Oshima et al. |
| 2014/0372072 | A1* | 12/2014 | Guo ..................... H05B 47/19 702/150 |
| 2016/0047890 | A1* | 2/2016 | Ryan ..................... H04W 4/026 398/118 |
| 2017/0212210 | A1* | 7/2017 | Chen ........................ G01S 5/06 |
| 2018/0087910 | A1* | 3/2018 | Salehi ..................... H04W 4/02 |
| 2018/0167140 | A1* | 6/2018 | Brandt-Pearce ... H04B 10/1149 |
| 2021/0092611 | A1* | 3/2021 | Pasricha ................. H04W 4/33 |

OTHER PUBLICATIONS

Vongkulbhisal et al: "A Fingerprinting-Based Indoor Localization System Using Intensity Modulation of Light Emitting Diodes", Microwave and Optical Technology Letters, vol. 54, No. 5, (May 2012), 1218-1227 (Year: 2012).*
Yin et al: "Indoor Visible Light Positioning with Angle Diversity Transmitter", 2015 IEEE 82nd Vehicular Technology Conference, Sep. 6-9, 2015 (Year: 2015).*
"U.S. Appl. No. 15/840,690, Notice of Allowance dated Nov. 26, 2018", 8 pgs.
"International Application Serial No. PCT/US2018/067281, International Search Report dated Mar. 28, 2019", 2 pgs.
"International Application Serial No. PCT/US2018/067281, Written Opinion dated Mar. 28, 2019", 9 pgs.
Arulampalam, M. Sanjeev, et al., "A Tutorial on Particle Filters for Online Nonlinear/Non-Gaussian Bayesian Tracking", IEEE Transactions on Signal Processing, vol. 50, No. 2, (Feb. 2002), 174-187.
Do, Trong-Hop, et al., "An in-Depth Survey of Visible Light Communication Based Positioning Systems", sensors 16, 678, (2016), 40 pgs.
Ganti, Divya, et al., "VLC-based Indoor Positioning System with Tracking Capability Using Kalman and Particle Filters", 2014 IEEE International Conference on Consumer Electronics (ICCE), (2014), 476-477.
Gu, Wenjun, et al., "Indoor Visible Light Positioning System with Multipath Reflection Analysis", 2016 IEEE International Conference on Consumer Electronics (ICCE), (2016), 89-92.
Jin, et al., "Indoor Localization with Channel Impulse Response Based Fingerprint and Nonparametric Regression", IEEE Transactions on Wireless Communications, vol. 9, No. 3, [Online] Retrieved from the internet: <https://ieeexplore.ieee.org/abstract/document/5427443 ]; entire document>, (Mar. 2010).
Kahn, Joseph M., et al., "Wireless Infrared Communications", Proceedings of the IEEE, vol. 85,No. 2, (Feb. 1997), 265-298.
Komine, Toshihiko, et al., "Fundamental Analysis for Visible-Light Communication System using LED Lights", IEEE Transactions on Consumer Electronics, vol. 50, No. 1, (Feb. 2004), 100-107.
Kuo, Ye-Sheng, et al., "Demo—Luxapose: Indoor Positioning with Mobile Phones and Visible Light", 3 pgs.
Rahaim, Michael, et al., "State Estimation and Motion Tracking for Spatially Diverse VLC Networks", 3rd IEEE Workshop on Optical Wireless Communications, (2012), 1249-1253.
Saha, Nilanjan, et al., "Extended Kalman filters using explicit and derivative-free local linearizations", Applied Mathematical Modelling 33, (2009), 2545-2563.
Vatansever, et al., "Image-sourced fingerprinting for LED-based indoor tracking", 2017 51st, Asilomar Conference on Signals, Systems and Computers,, [Online] Retrieved from the internet: <https://ieeexplore.ieee.org/abstract/document/8335480>, (Nov. 1, 2017).
Vongkulbhisal, Jayakorn, "A Fingerprinting-Based Indoor Localization System Using Intensity Modulation of Light Emitting Diodes", Microwave and Optical Technology Letters, vol. 54, No. 5, (May 2012), 1218-1227.
Zhang, Weizhi, et al., "Asynchronous indoor positioning system based on visible light communications", Optical Engineering 53 (4), (Apr. 2014), 10 pgs.
"International Application Serial No. PCT/US2018/067281, International Preliminary Report on Patentability dated Jul. 2, 2020", 11 pgs.

\* cited by examiner

POSITIONING THROUGH MULTIPATH REFLECTION

PRIORITY APPLICATION

This application is a U.S. National Stage Filing under 35 U.S.C. § 371 from International Application No. PCT/US2018/067281, filed on Dec. 21, 2018, which claims priority to U.S. Provisional Patent Application Ser. No. 62/609,371, filed Dec. 22, 2017, which are incorporated by reference herein in their entireties.

STATEMENT OF GOVERNMENT INTEREST

This invention was made with government support under Grant No. 1521387, awarded by National Science Foundation. The government has certain rights in the invention.

TECHNICAL FIELD

This document pertains generally, but not by way of limitation, to positioning, and particularly but not by way of limitation to network-side positioning in optical communication networks.

BACKGROUND

Visible light communication (VLC) systems are used to communicate data using optical energy, as compared to much longer wavelength radio-frequency energy, for example. One or more light sources can be controlled to modulate an optical signal to communicate data from one device to another. The receiving device can include one or more sensors configured to sense the optical signal and provide the sensed data to a circuit to recover the communicated data.

SUMMARY

The availability of wireless mobile devices (e.g., "user equipment") creates an opportunity for provisioning of location-based services (LBS). A quality of LBS may generally rely on accurate position and tracking of a target, such as user equipment, within an enclosed area. A global navigation satellite system (GNSS) may be suitable for use in outdoor locations, but may suffer from poor accuracy or may even be unusable within an enclosed area due to obstructions or diffusion. For example, Global Positioning System (GPS) signals do not provide accurate estimates in indoor areas.

The present inventors have recognized, among other things, that it can be desirable to determine the location of one or more user devices or other equipment using an optical communication network, such as within an enclosed area that is otherwise not well-served by other positioning or tracking approaches. In one example, a positioning system includes a transmitter, a receiver, and a controller. The transmitter includes at least one energy source configured to emit an optical or quasi-optical electromagnetic signal as a channel communication. The receiver includes at least one detector element configured to receive the channel communication. The controller is connected to the receiver and configured to estimate a position of the transmitter within a space using a reference map of the space and diffuse components of an impulse response of the channel communication.

In another example, a method of estimating a location includes emitting, by a transmitter positioned within a space, an optical or quasi-optical electromagnetic signal as a channel communication. The method also includes receiving, by a detector, the channel communication, determining, by a controller connected to the detector, one or more diffuse components of an impulse response of the channel communication, and estimating, by the controller, the location of the transmitter within the space using the one or more diffuse components and a reference map.

In another example, a system includes a user equipment device, one or more photodetectors, and a controller. The user equipment device includes a transmitter configured to emit an optical signal as a channel communication. The photodetectors are configured to receive the optical signal. The controller is connected to the photodetectors and configured to estimate a position of the user equipment device within an indoor space based on a reference map of the indoor space and one or more diffuse components of an impulse response of the channel communication. While various examples described herein are referred to as "visible" or "optical", such techniques are applicable to examples involving electromagnetic communication at relatively short wavelengths such as millimeter-wavelength-range systems. While various examples described herein refer to positioning performed by the network-side of the communication system, the transmitters can also be part of the network-side of the communication system and the receivers can be part of the user-side of the communication system.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A positioning system is disclosed herein that performs location determination for devices in an optical (e.g., visible or infra-red wavelength range) or other relatively-short-wavelength (e.g., millimeter-wavelength-range) communication system. In an example, the communication system includes an access point that has one or more photodetectors or other sensors positioned and configured to sense an optical communication from one or more devices (e.g., one or more user equipment devices such as mobile devices or other devices such as factory equipment, robots, and the like). The access point can include or can be coupled to one or more luminaires or other fixtures. The network-side of the communication system is configured to execute one or more positioning algorithms to estimate a position of one or more devices based at least in part on a channel impulse responses of the optical communications from the one or more devices. While described as performed by the network-side of the communication system, positioning using components of the channel impulse response can also be performed on the user-side.

Positioning has been accomplished at the user-side of the network using a received signal strength (RSS) at a user device, for example. The present inventors have recognized, among other things, that it is advantageous for the optical communication system to determine the position of user and other devices that connect to the network. For example, it can be desirable to determine the location of all robotics devices within a factory or other indoor space. It can also be desirable for communications purposes, such as resource allocation and hand-off where the network monitors the number and position of the users or user equipment (UE). This can be accomplished by analyzing the multi-path signals of a received communication, which have been considered destructive in existing optical communication systems. A receiver (e.g., an access point of the communication system) can use the line-of-sight (LOS) peak power in conjunction with diffuse components of the impulse response, such as the second power peak (SPP), such as detected in the time-domain, to estimate a location. Fingerprinting, for example, can be used to compare the received signal components to a reference map to obtain an estimated location of a target within the indoor space.

Figure 1:
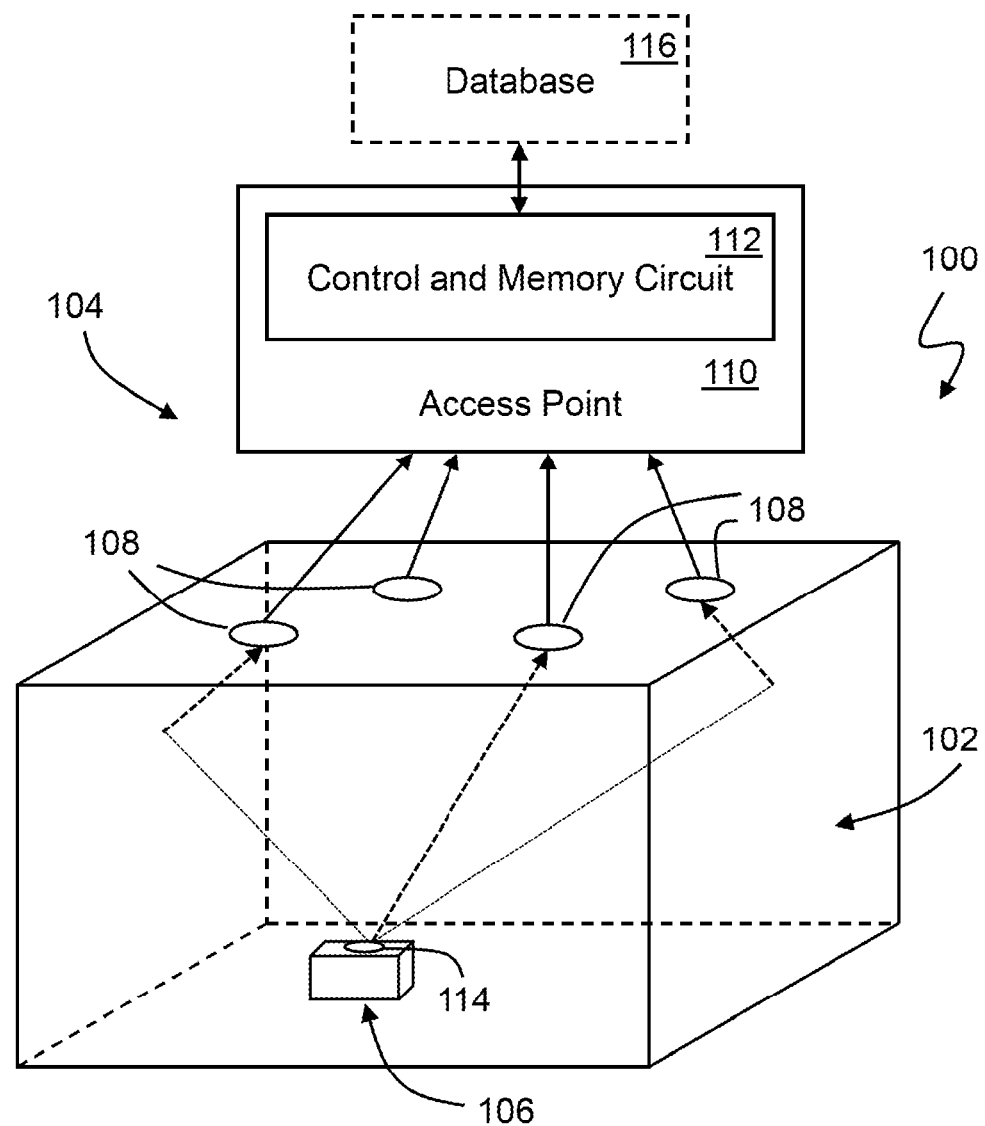
FIG. 1 is a diagram illustrating an indoor optical positioning system.

FIG. 1 is a diagram illustrating a positioning system 100 located within an indoor area 102. The positioning system 100 includes network-side system 104 and a UE device 106. The network-side system 104 includes photodetectors 108, access point 110, and a control and memory circuit 112. In the example illustrated in FIG. 1, the positioning system 100 can also include light sources so as to both receive communication from, and transmit communication to, the UE device 106. In other examples, the network side system 104 can include only the photodetectors 108.

The indoor area 102 can be a building or other structure within which it is desirable to locate one or more devices. For outdoor areas, a Global Navigation Satellite System (GNSS) can be used. GNSS signals, such as Global Positioning System (GPS) signals, do not allow accurate positioning in indoor areas due to obstructions and diffusion. In particular, GPS signals are subject to attenuation and losses in indoor environments because the signals poorly penetrate through buildings, walls, and other obstacles. In addition, these signals experience unpredictable reflections as they encounter such obstacles. Such attenuation and reflection can render GPS inaccurate for indoor positioning. Additionally, employing optical energy instead of radio frequency (RF) energy is desirable for applications where RF is forbidden, such as in hospitals, airplanes, and the military field, for example.

The UE device 106 includes a transmitter 114 configured to emit a signal to communicate with the access point 110. The UE device 106 can be any device configured to emit an electromagnetic signal in the visual, infrared, or other band (e.g., a quasi-optical band such as encompassing a millimeter-range of wavelengths), for example. The UE device 106 can be a manufacturing or navigating robot, a mobile device such as a tablet or phone, or any other mobile user device. The UE device 106 can also include one or more photodetectors for receiving downlink communication from the access point 110 and a control circuit, such as described below in FIG. 6, for interpreting communication from the access point 110.

The control and memory circuit 112 is connected to provide control for the access point 110 and interpret signals received by the photodetectors 108. For example, the control and memory circuit 112 can be configured to execute one or more algorithms to estimate a position of the UE device 106 within the indoor space 102. The control and memory circuit 112 can include one or more controller, processor, or other digital logic circuit, and one more volatile and/or non-volatile memories as described in further detail below with reference to FIG. 6.

The access point 110 can exploit the multi-path signals of the uplink communication from the UE device 106 to estimate the position of the UE device 106. While illustrated as several photodetectors 108, positioning can be achieved by the network-side system 104 using a single photodetector 108. While illustrated as a single UE device 106, the positioning system 100 can be used to estimate positions of any number of UE devices 106 within the indoor area 102. While described as exploiting the multi-path signals of the uplink communication, the UE device 106 can also perform positioning by similarly exploiting multi-path signals of the downlink communication from the access point 110.

Fingerprinting can be used by the control and memory circuit 112 to estimate the position of the UE device 106. A fingerprint map, for example, can be generated that maps channel impulse responses for each grid point of a grid of the indoor area 102. For example, a two-dimensional grid of the indoor area 102 can be established and a database 116 of the channel impulse response for each point on the grid can be created. The database can be stored in a memory of the control and memory circuit 112, or in any other location, such as an external server, accessible by the access point 110. While illustrated as a grid with several grid points, the fingerprint map can be any set of predetermined locations of the indoor area 102.

In addition to acting as a positioning system, the positioning system 100 can be used for data communication, acting as a visible light communication (VLC) or other optical communication system, for example. Light sources, such as white LED fixtures, for example, can be fixed to a ceiling of the indoor area 102 and configured to optically transmit downlink data to the UE device 106, which can be received by the UE device 106 using one or more photodetectors.

Figure 2:
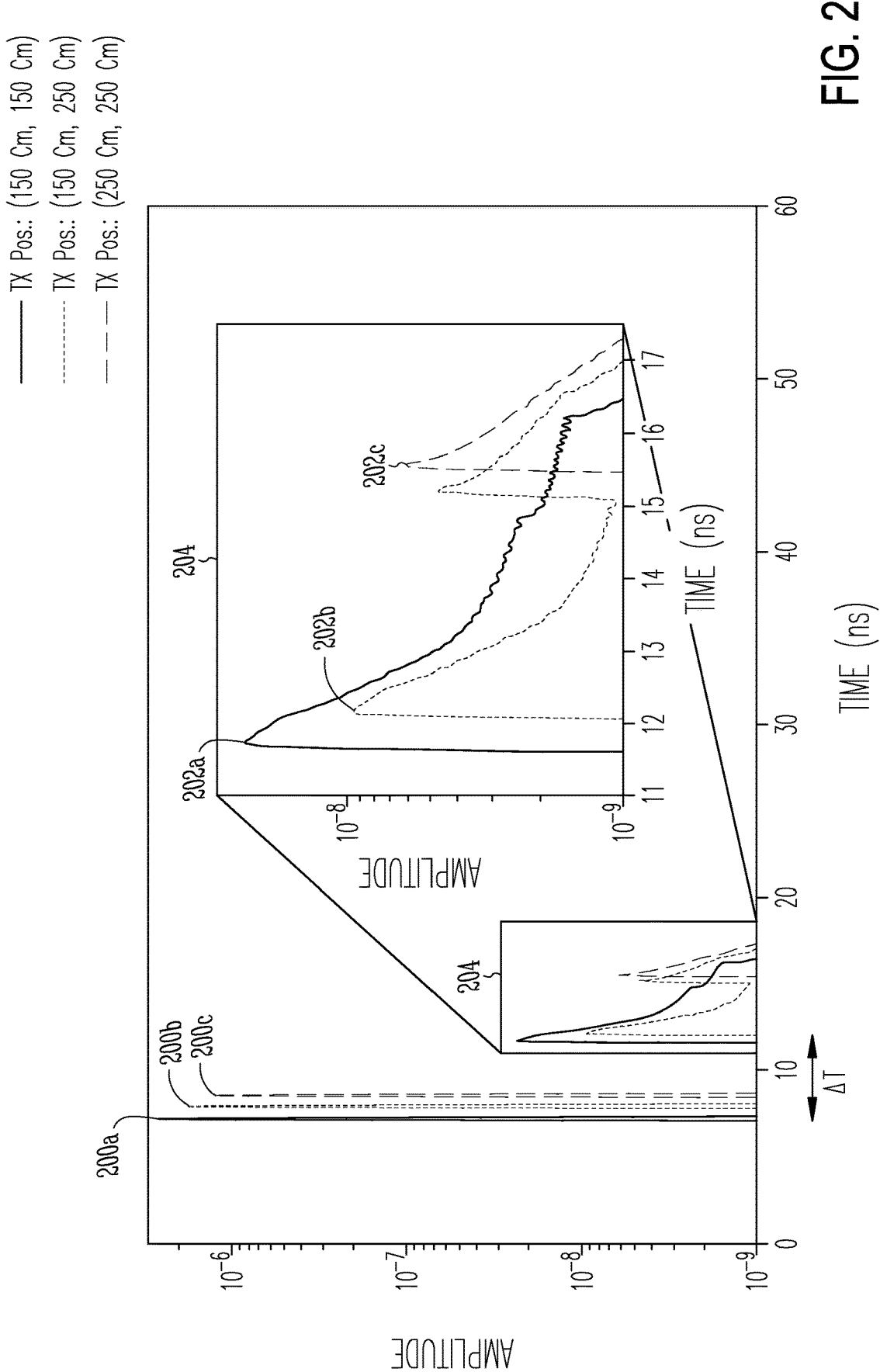
FIG. 2 is a chart illustrating example channel impulse responses for an optical positioning system for transmitters at different locations within an indoor space.

FIG. 2 is a chart illustrating an impulse response in the time-domain for an uplink pulse from the UE device 106 at three different locations within the indoor space 102. In FIG. 2, the impulse response is shown for a photodetector 108 positioned at (x, y, z) coordinates of (150 cm, 150 cm, 300 cm) within the indoor space 102. In this example, the size of the indoor space 102 is 5 m×5 m×3 m. In other examples, the photodetector 108 can be positioned at any point within the indoor space 102, and the indoor space 102 can be of any size. The first signal shown in FIG. 2 is an impulse response for a pulse from a UE device 106 positioned at (x, y) coordinates of (150 cm, 150 cm), the second is for a pulse from a UE device 106 positioned at (150 cm, 250 cm), and the third is for a pulse from a UE device 106 positioned at (250 cm, 250 cm). The UE devices 106 are assumed to be at a common z-coordinate (height) within the indoor space, such as 85 cm. In other examples, the UE devices 106 can be at different heights within the indoor space 102.

As seen in FIG. 2, the impulse response for each UE device 106 includes a line-of-sight (LOS) peak power 200a-200c, and a second power peak (SPP) 202a-202c (seen in zoomed region 204). The zoomed region 204 illustrates the diffuse portion of the impulse response for each of the three UE devices 106. The SPP 202a-202c is the most significant component of the diffuse portion, and can be indicative of a one-bounce reflection of the uplink signal, for example. The time $\Delta\tau$ is the delay between an LOS peak power 200a-200c and a respective SPP 202a-202c. The LOS peak power 200a-200c, the SPP 202a-202c, and the time delay $\Delta\tau$ can each be used by the network-side 104 of the positioning system 100 to estimate the position of each UE device 106 within the indoor area 102, as described in detail below.

Figure 3A:
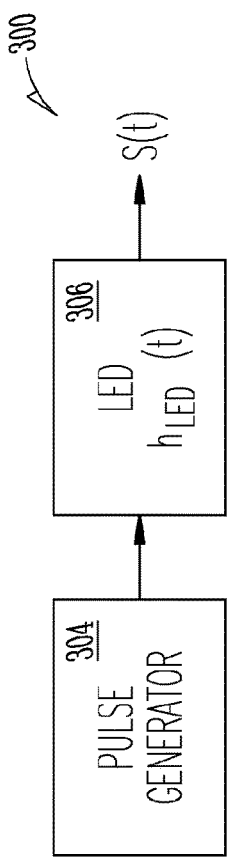
FIG. 3A is a block diagram illustrating an example transmitter in an optical positioning system.
Figure 3B:
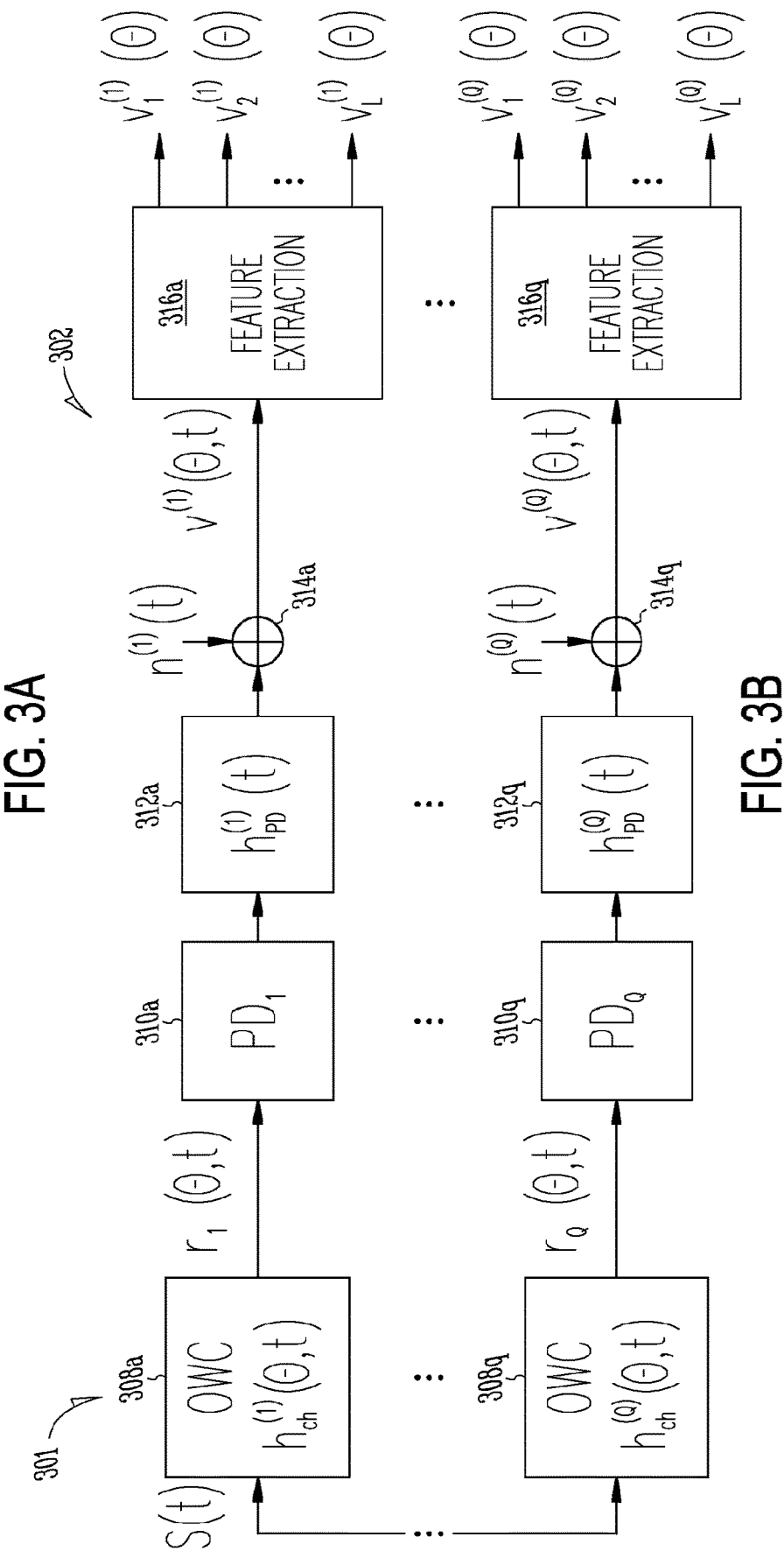
FIG. 3B is a block diagram illustrating an example receiver in an optical positioning system.

FIG. 3A is a block diagram illustrating an example transmitter 300 and FIG. 3B is a block diagram illustrating an example channel 301 and an example receiver 302 for the positioning system 100 according to a channel model. The transmitter 300 can be implemented on the UE device 106 or any other device for which the access point 110 of system 100 desires to know the position. The transmitter 300 includes a pulse generator 304 and a light source, illustrated as a light emitting diode (LED) 306. The optical channel 301 includes optical wireless channels 308a-308q, and the receiver 302 includes photodetectors 310a-310q, impulse responses 312a-312q, adders 314a-314q, and feature extractors 316a-316q. The components of the receiver 302 can be implemented by the photodetectors 108 and the access point 110. In another example, the transmitter 300 can be implemented as part of the access point 110, and the receiver 302 can be part of a UE device 106.

Using an example channel model, the pulse generator 304 sends an ideal delta function pulse train and the optical signal S(t) emitted by the LED 306 has a bandwidth (BW) limited by the LED impulse response, $h_{LED}(t)$. Each photodetector 310a-310q (representative of photodetectors 108) receives a response $r(\theta, t)$ from a respective optical wireless channel 308a-308q. Each channel has channel characteristics $h_{ch}(\theta, t)$ that lead to the respective channel response $r(\theta, t)$. Each photodetector 310a-310q also has a respective impulse response $h_{PD}(t)$. The system also includes noise, which can be modeled as additive white Gaussian noise (AWGN), indicated as $n(t)$. Thus, the output for the qth receiver path $v^{(q)}(\theta, t)$ can be written as:

$$v^{(q)}(\theta,t)=h_{LED}(t)*h_{ch}^{(q)}(\theta,t)*h_{PD}(t)+n^{(q)}(t) \quad (1)$$

where $\theta=(x, y)$ is the two-dimensional coordinates within the indoor space 102 of the UE device 106 to be estimated. The system bandwidth (BW) is defined as the bandwidth resulting from both $h_{LED}(t)$ and $h_{PD}(t)$.

In this example, the position of the UE device 106 is estimated using features captured from $v(\theta, t)$. The feature extraction blocks 316a-316q can be implemented by control and memory circuit 112, for example, using hardware, software, or a combination thereof $v(\theta, t)$ can take the form of the impulse response shown in FIG. 2, for example.

In one example, fingerprinting is employed in which an observation vector is obtained for comparison to a reference map. The observation vector, for example, can include the received LOS peak power ($P_{LOS}$), the SPP ($P_{SPP}$), and the time delay between the LOS and SPP components ($\Delta\tau$). These three observations determined by the feature extraction blocks 316a-316q from $v(\theta, t)$ can be expressed as:

$$v_1(\theta)=P_{LOS}(\theta)+n_1.$$

$$v_2(\theta)=P_{SPP}(\theta)+n_2,$$

$$v_3(\theta)=\Delta\tau(\theta)+n_3. \quad (2)$$

where $n_1$ and $n_2$ are independent Gaussian noises with variance $\sigma^2$, and $n_3$ is the time delay noise between the LOS peak power and the SPP which is modeled as a Gaussian noise with variance $\sigma_\tau^2$ and assumed independent from $n_1$ and $n_2$.

In an example, a 2-dimensional osbervation for each photodetector 108 using only the first and second peak RSS values, $V(\theta)=[v_1(\theta), v_2(\theta)]^T$ can be used as the observation vector. In another example, a 3-dimensional observation for each photo detector 108 can be used as the observation vector that also includes the time delay $\Delta\tau$, $V(\theta)=[v_1(\theta), v_2(\theta), v_3(\theta)]^T$. The observation vector can then be used in the fingerprinting scheme, for example, to estimate the location of the respective UE device 106.

Figure 4B:
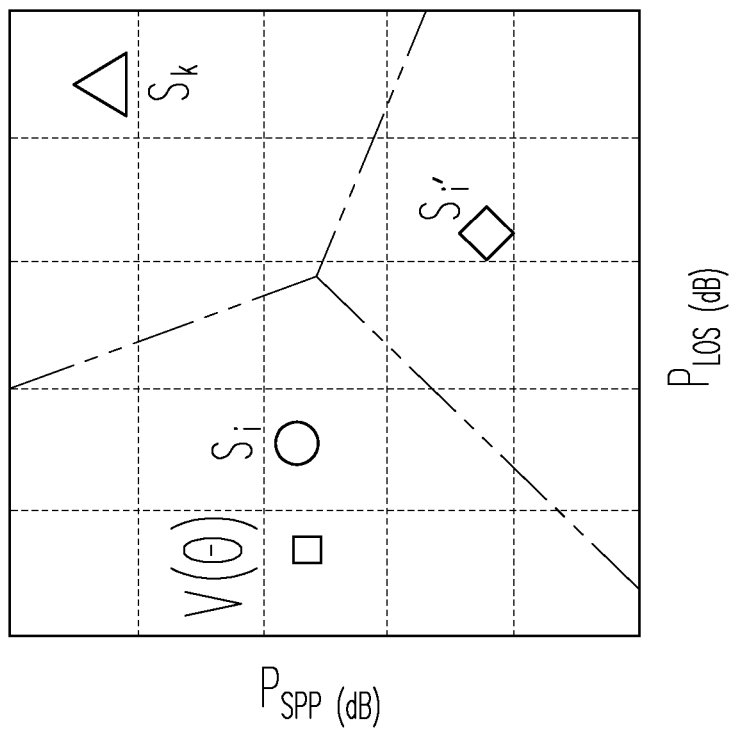
FIG. 4B is an example observation space for an optical positioning system.
Figure 4A:
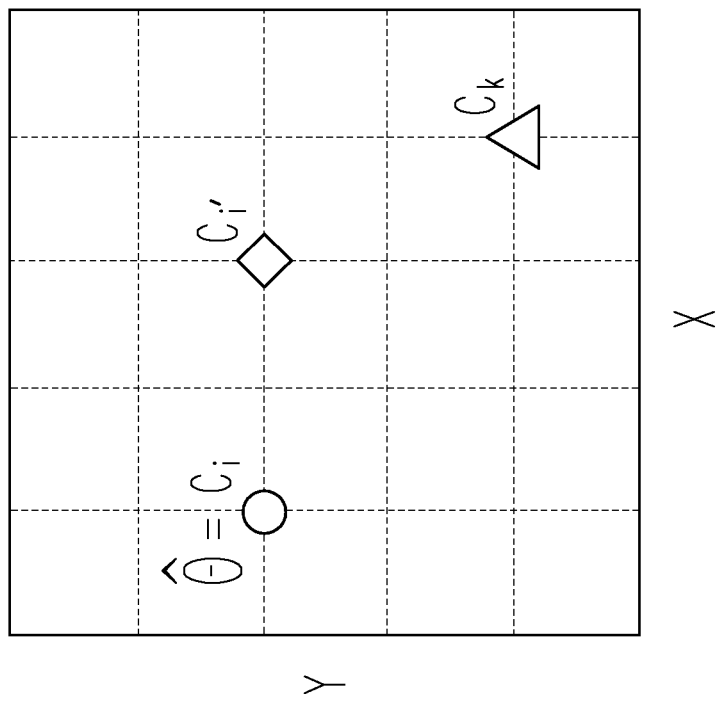
FIG. 4A is an example grid used for fingerprinting for an optical positioning system.

FIG. 4A illustrates an example grid used for fingerprinting and FIG. 4B illustrates an example observation space for the fingerprinting scheme. The indoor area 102 can be divided into a horizontal N×M grid, assuming a common z-coordinate position (i.e., height) for each UE device 106. FIG. 4A illustrates a portion of the overall grid for the indoor area 102. The database 116 can be created that stores the channel impulse response for each grid point. For example, the LOS peak power component $P_{LOS}$, the SPP component $P_{SPP}$, and the time delay $\Delta\tau$, can each be stored in the database for each grid point. Then, a vector $S_k(\hat{\theta})=[P_{LOS}(\hat{\theta}), P_{SPP}(\hat{\theta}), \Delta\tau(\hat{\theta})]$, $k \in \{1, \ldots, MN\}$, can be created that corresponds to the kth point on the measurement grid. The database can be populated manually, or using a crowd-sourcing or other method of obtaining the data automatically. The database 116 can be stored in the control and memory circuit 112, or can be stored in a server or other location accessible by the control and memory circuit 112 over a network connection, for example.

Maximum likelihood estimation can be employed for positioning, where the control and memory circuit 112 looks for the constellation point $S_k(\hat{\theta})$ having a minimum Euclidean distance to the observation vector $V(\theta)$ in the observation plane. The observation plane is a mapping of the constellation points $S_k(\hat{\theta})$ in a space defined using the impulse components, as seen in FIG. 4B. FIGS. 4A and 4B illustrate an example of mapping between an example region close to the observation vector $V(\theta)$ in the observation plane (FIG. 4B) onto the room plane (FIG. 4A). The decision regions (e.g., Voronoi regions) are depicted based on the minimum Euclidean distance criterion. In the example illustrated in FIG. 4B, $V(\theta)$ is located in the $S_i$ decision region, hence $\hat{\theta}=C_i$ is the estimated location that is the center point of the i'th positioning cell. In another example, a k-nearest neighbor algorithm can be used to map the observations to the room plane.

Various errors can be introduced into the positioning algorithm. One type of error is the AWGN noise discussed above. Another type of noise is the quantization error, which is an offset error between a grid point and an actual position of a UE device 106. The quantization error is based on the size of each grid cell. Another source of error is a result of the impulse response features observed within an entire grid cell corresponding to a grid point are not equal to those of a corresponding detection constellation point.

Figure 5:
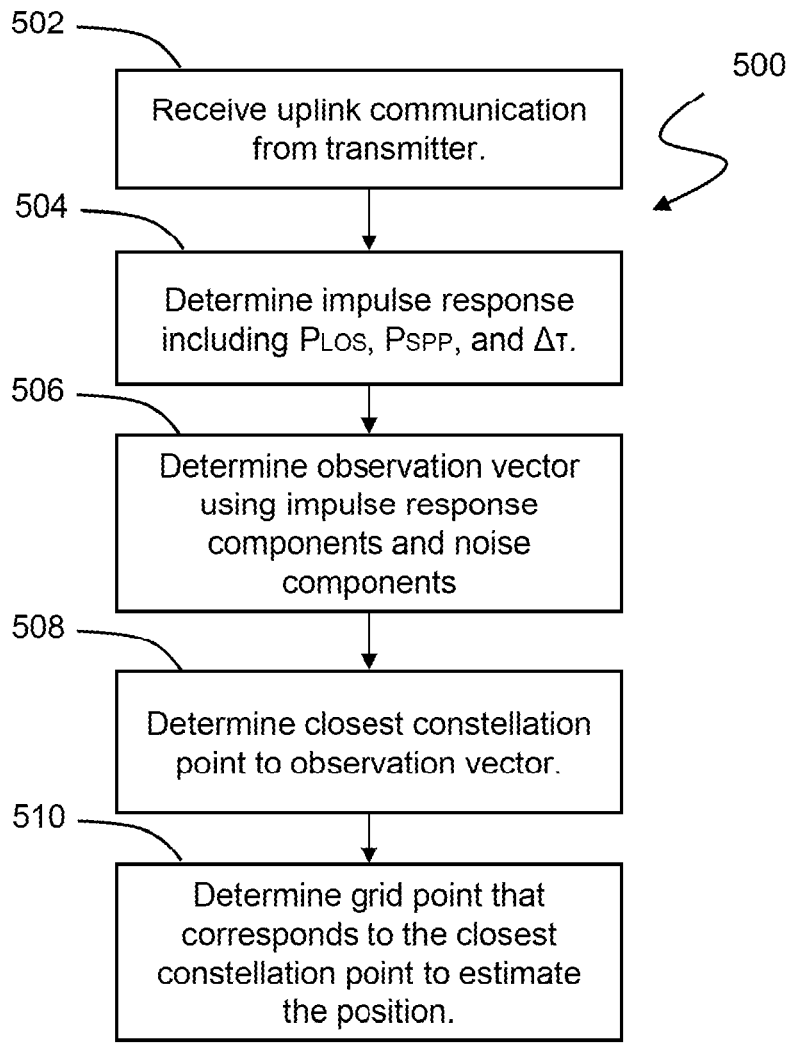
FIG. 5 is a flowchart illustrating a method of performing indoor positioning using a network side of an optical network.

FIG. 5 is a flowchart illustrating a method 500 of performing indoor positioning of one or more UE or other devices using an optical network. At step 502, a transmitter emits an electromagnetic signal (e.g., encompassing an optical wavelength range or quasi-optical wavelength range), such as an infrared pulse, as a communication with an optical access point. In an example, the transmitter can be one or more LEDs faced vertically upward to emit a signal toward one or more photodetectors positioned on a ceiling of an indoor space. In another example, the transmitter can be a white LED fixture on the ceiling configured to emit a signal for one or more photodetectors of a UE device. In an example, the transmitter can send a single narrow time pulse. In another example, to increase the SNR, or to represent a code to differentiate between UE devices, the transmitter can send a train of pulses, with enough time between pulses to avoid inter-symbol interference. One or more photodetectors senses the communication from the transmitter.

At step 504, a circuit connected to the photodetector(s) is configured to determine components of the channel impulse response of the channel communication from the transmitter. These components can include $P_{LOS}$, $P_{SPP}$, and $\Delta\tau$. At step 506, a controller determines an observation vector using the features determined at step 504. Once the observation vector has been obtained, it can be mapped to the observation space (shown in FIG. 4B). At step 508, a minimum distance algorithm can be used to determine the closest constellation point to the mapped observation vector. At step 510, once the closest constellation point is determined, the grid point corresponding to the closest constellation point can be obtained. The grid point can be used as the estimated position of the UE device, or an interpolation algorithm can be used to minimize the quantization error.

Figure 6:
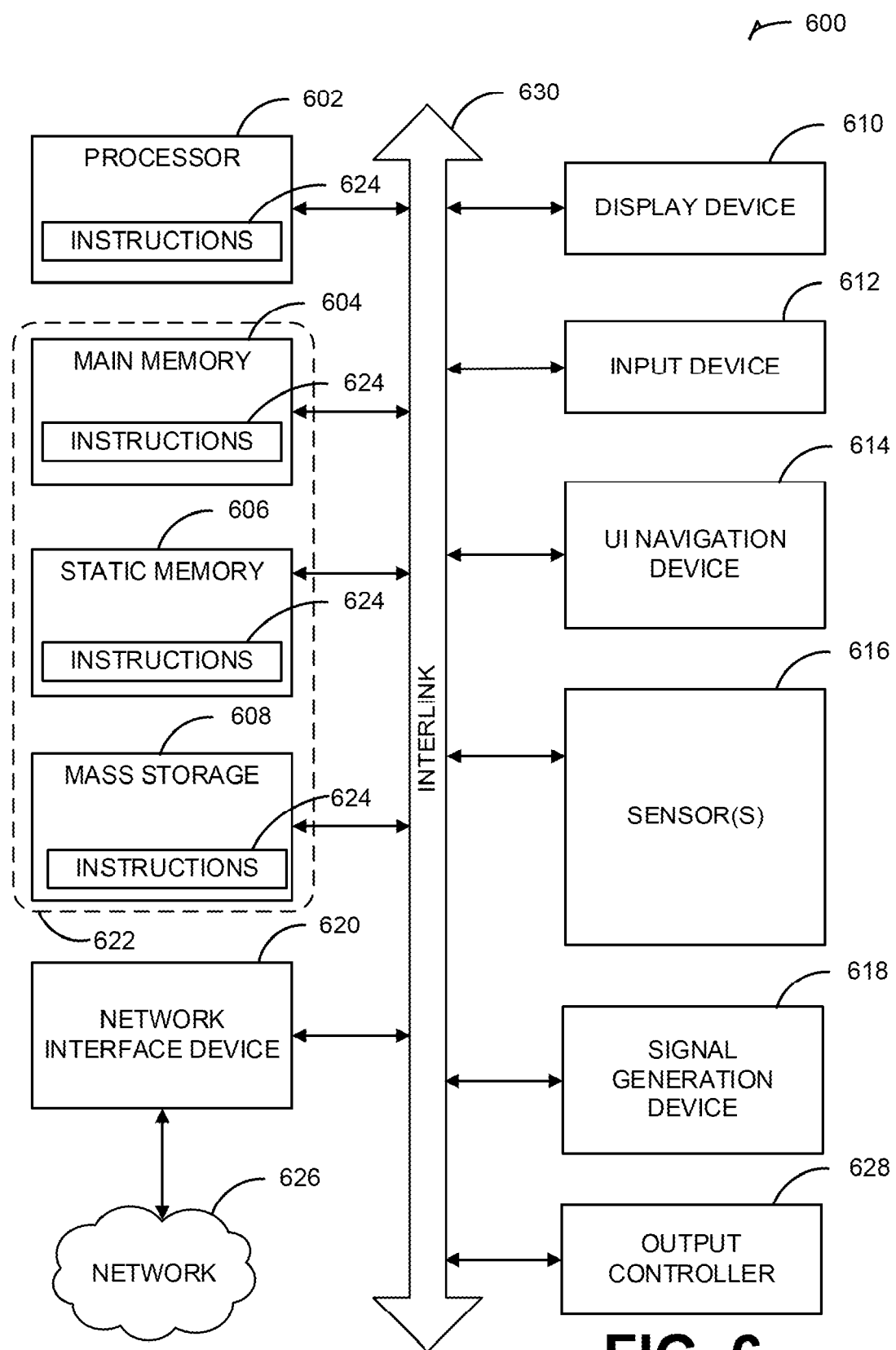
FIG. 6 is a block diagram illustrating an example of a machine upon which one or more embodiments may be implemented.

FIG. 6 illustrates a block diagram of an example machine 600 upon which any one or more of the control and memory circuit 112, a control circuit of the transmitter or other UE device, or any other computing system discussed herein can be implemented. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a user equipment (UE) device such as a tablet PC, a set-top box (STB), a personal digital assistant (PDA), a mobile telephone, or a network side device such as a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a visible light communication (VLC) network, local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as Wi-Fi, IEEE 802.16 family of standards known as WiMax®, IEEE 802.15.4 family of standards, peer-to-peer (P2P) networks, among others). In an example, the network interface device 620 may include one or more light sources, photodetectors, physical jacks (e.g., Ethernet, coaxial, or phone jacks) or one or more antennas to connect to the communications network 626. In an example, the network interface device 620 may include light sources and photodetectors to optically communicate. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A positioning system comprising:
    a transmitter comprising at least one energy source configured to emit an optical or quasi-optical electromagnetic signal as a channel communication;
    a receiver comprising at least one detector element configured to receive the channel communication; and
    a controller connected to the receiver and configured to determine an observation vector for the channel communication using an impulse response of the channel communication, and estimate a position of the transmitter within a space using the observation vector and a reference map including reference vectors for points of the space, wherein a reference vector for a point of the space includes a reference line of sight (LOS) peak component and one or more reference diffuse components of an impulse response for the point, and reference time delay between the reference LOS peak component and a reference second power peak (SPP), wherein the reference SPP is a most significant diffusive component of the one or more reference diffuse components of the impulse response;
    wherein the observation vector includes a received line-of-sight (LOS) peak power and a received second power peak (SPP) of the channel communication, and a received time delay between the received line-of-sight peak power and the received second power peak.

2. The system of claim 1, wherein the reference map includes a set of predetermined locations within the space, and wherein the positioning system further comprises a database configured to store a reference impulse response or features thereof for each of the plurality of locations within the space.

3. The system of claim 2, wherein the reference impulse response or features thereof includes a reference second power peak and a reference line-of-sight peak power for each of the plurality of locations within the space.

4. The system of claim 3, wherein the controller is configured to estimate the position by using the observation vector to determine a closest one of the plurality of points of the plurality of locations within the space.

5. The system of claim 4, wherein the at least one detector element comprises at least one photodetector.

6. The system of claim 1, wherein the at least one energy source comprises a light emitting diode.

7. A method of estimating a location, the method comprising:
emitting, by a transmitter positioned within a space, an optical or quasi-optical electromagnetic signal as a channel communication;
receiving, by a detector, the channel communication;
determining, by a controller connected to the detector, an observation vector for the channel communication from an impulse response of the channel communication; and
estimating, by the controller, the location of the transmitter within the space using the determined observation vector for the channel communication and a reference map storing reference vectors for points within the space, wherein a reference vector for a point within the space includes a reference line of sight (LOS) peak component of an impulse response for the point, one or more reference diffuse components of the impulse response, and reference time delay between the reference LOS peak component and a reference second power peak (SPP), wherein the reference SPP is a most significant diffusive component of the one or more diffuse components of the impulse response;
wherein the determined observation vector includes a received line-of-sight (LOS) peak power and a received second power peak (SPP) of the channel communication, and a received time delay between the received line-of-sight peak power and the received second power peak.

8. The method of claim 7, wherein the reference map includes a set of predetermined locations within the space, and wherein the method further comprises:
generating reference impulse responses or features thereof for each of the set of predetermined locations; and
storing the reference impulse responses or features thereof for each of the set of predetermined locations in a database.

9. The method of claim 8, wherein estimating, by the controller, the location of the transmitter comprises:
determining a closest one of the set of predetermined locations using the observation vector.

10. The method of claim 7, wherein emitting, by the transmitter, the electromagnetic signal comprises emitting electromagnetic signal using a light emitting diode of the transmitter.

11. The method of claim 10, wherein receiving, by the detector, the channel communication comprises receiving, by a photodetector, the electromagnetic signal.

12. A system comprising:
a user equipment device comprising a transmitter configured to emit an optical signal as a channel communication;
one or more photodetectors configured to receive the optical signal; and
a controller connected to the one or more photodetectors and configured to estimate a position of the user equipment device within an indoor space based on a reference map of the indoor space and an observation vector determined for an impulse response of the channel communication, wherein the determined observation vector includes a received line-of-sight (LOS) peak component of an impulse response for the channel communication, one or more received diffuse components of the impulse response, and a received time delay between the received LOS peak component and a received second power peak (SPP), wherein the received SPP is a most significant diffusive component of the one or more diffuse components of the impulse response, and the reference map includes reference vectors for multiple points of the indoor space;
wherein the reference map includes a reference line-of-sight (LOS) peak power and a reference second power peak (SPP) of the channel communication, and a reference time delay between the reference line-of-sight peak power and the reference second power peak.

13. The system of claim 12, wherein the reference map includes a set of predetermined locations of the indoor space, and wherein the reference map includes a database configured to store a reference vector for each of the set of predetermined locations.

14. The system of claim 13, wherein the controller is configured to determine a closest one of the predetermined set of locations using the observation vector.

15. The system of claim 14, wherein the observation vector further comprises an additive Gaussian white noise for the channel communication.

16. The system of claim 12, wherein the transmitter comprises a pulse generator and a light-emitting diode.

17. The system of claim 12, wherein the one or more photodetectors each comprise an infrared photodetector.

* * * * *